United States Patent [19]

Pharaoh

[11] Patent Number: 5,372,376

[45] Date of Patent: Dec. 13, 1994

[54] FOLDABLE WHEELBARROW

[76] Inventor: Anthony P. Pharaoh, 42 Trevor Rd., Rondebosch East, 770C Cape Town, Cape Province, South Africa

[21] Appl. No.: 84,204

[22] PCT Filed: Dec. 23, 1991

[86] PCT No.: PCT/GB91/02304

§ 371 Date: Oct. 13, 1993

§ 102(e) Date: Oct. 13, 1993

[87] PCT Pub. No.: WO92/12035

PCT Pub. Date: Jul. 23, 1992

[30] Foreign Application Priority Data

Jan. 4, 1991 [ZA] South Africa ............ 910085

[51] Int. Cl.⁵ ................................. B62B 1/20
[52] U.S. Cl. .................. 280/653; 280/47.31; 298/3
[58] Field of Search ............ 280/652, 653, 655.1, 280/655, 659, 47.3, 47.31, 47.315, 2, 3

[56] References Cited

U.S. PATENT DOCUMENTS

| | | | |
|---|---|---|---|
| 2,973,224 | 2/1961 | Well, Sr. | 280/47.31 |
| 4,471,996 | 6/1984 | Primeau | 280/653 |
| 4,789,171 | 12/1988 | Porter | 280/47.33 |
| 4,921,305 | 5/1990 | Steer | 280/47.31 |

*Primary Examiner*—Richard M. Camby
*Attorney, Agent, or Firm*—Young & Thompson

[57] ABSTRACT

The invention provides a foldable wheelbarrow (10.1) which comprises a load bin (12), a wheel (14) for supporting the wheelbarrow, and a connecting structure (16) which connects the wheel (14) to the load bin (12), the connecting structure (16) being displaceable with respect to the load bin. The connecting structure (16) is preferably pivotally displaceable with respect to the load bin (12) and may comprise first (16.1) with second (16.2) components, the wheel (14) being mounted on the first component (16.1) with the second component (16.2) being connected to the first component (16.1) at a first pivot connection (18). The second component (16.2) may be connected to the bin (12) at a second pivot connection (20).

5 Claims, 5 Drawing Sheets

FOLDABLE WHEELBARROW

BACKGROUND OF THE INVENTION

This invention relates to a wheelbarrow, and relates in particular to a foldable wheelbarrow.

Due to its rigid construction, a conventional wheelbarrow is difficult to transport as it does not fit conveniently into the trunk of a domestic motor vehicle. Furthermore, modern trends in housing throughout the world are moving towards smaller, more compact dwellings in which storage space is at a premium. In the light of this, it would be desirable to provide a wheelbarrow which, while being sturdy and robust and having a similar load capacity to a conventional wheelbarrow, is nevertheless also able to be stored compactly and transported more easily.

SUMMARY OF THE INVENTION

According to the invention, there is provided a wheelbarrow comprising a load bin, a wheel for supporting the wheelbarrow, and a connecting structure which connects the wheel to the load bin, the connecting structure being pivotally displaceable with respect to the load bin, characterized in that:

the connecting structure comprises first and second components, the wheel is mounted on the first component, the second component is connected to the first component by means of a first pivot connection, and the second component is connected to the bin by means of a second pivot connection.

The first component may, in the operative condition of the wheelbarrow, extend from the wheel rearwardly underneath the load bin to form a support for the bin, and the second component may, in the operative condition of the wheelbarrow, extend upwardly and rearwardly from the bin, to form handles for the wheelbarrow.

The wheelbarrow may have legs which form part of either the first or the second component of the connecting structure.

The arrangement may be such that, by pivoting the first and second components about the first and second pivot connections, the first component with the wheel is displaced from its operative position to an inoperative position in which it is at least partly accommodated in the bin, and the second component is displaced from its operative position to an inoperative position in which it is also at least partly accommodated in the bin.

BRIEF DESCRIPTION OF THE DRAWINGS

The invention will now be described in more detail by way of example only with reference to the accompanying drawings, in which.

DESCRIPTION OF EMBODIMENTS

Figure 1:
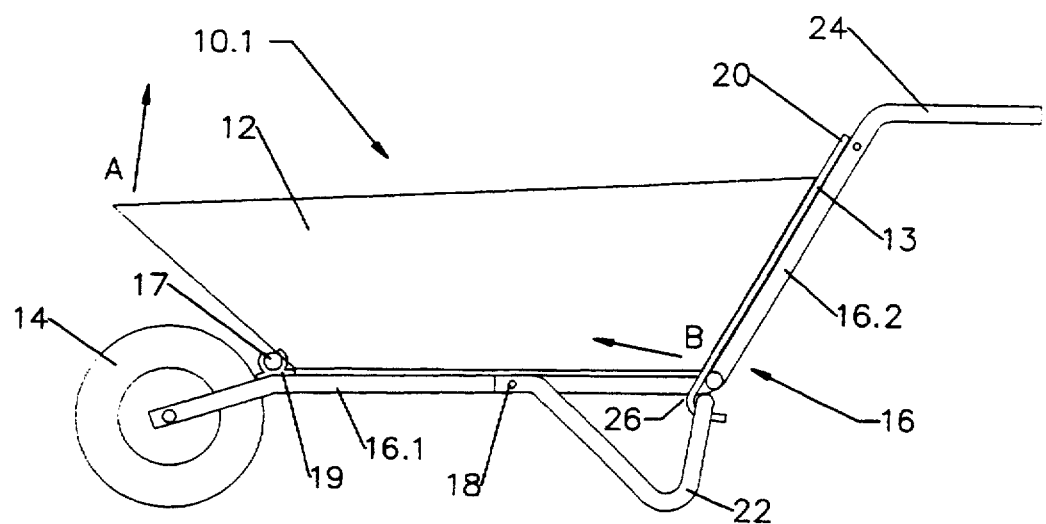
FIG. 1 is a side view of a wheelbarrow in accordance with one embodiment of the invention.
Figure 2:
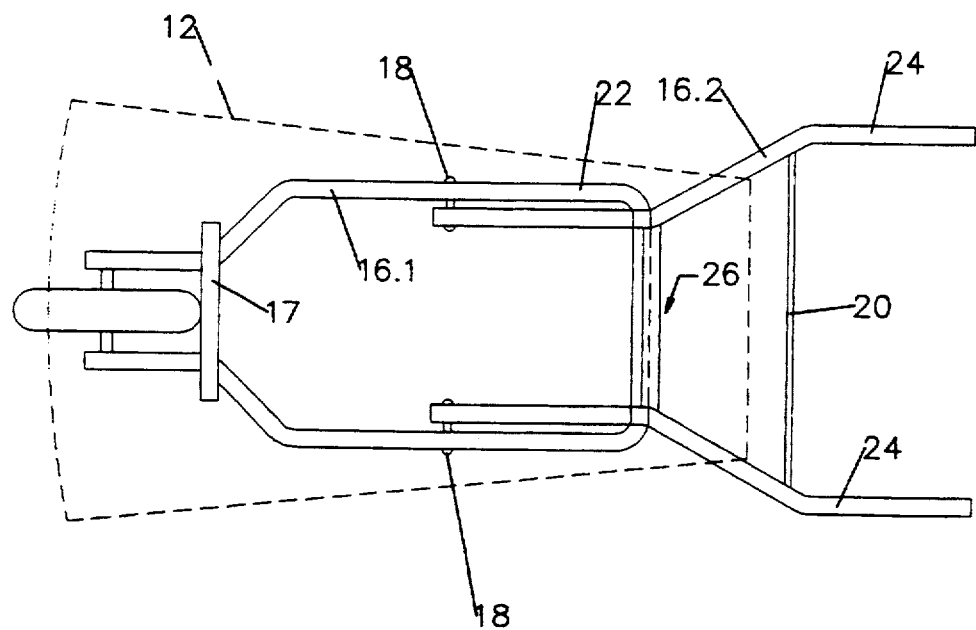
FIG. 2 is a plan view of the wheelbarrow with the load bin thereof being shown in phantom outline.

Referring first to FIGS. 1 and 2, reference numeral 10.1 generally designates a wheelbarrow comprising a load bin 12, a wheel 14, and a connecting structure 16 which connects the wheel 14 to the bin 12. The connecting structure 16 comprises a first component 16.1 and a second component 16.2. The wheel 14 is mounted on the first component 16.1. The second component 16.2 is connected to the first component 16.1 by means of a pair of first pivot connections 18, and is connected to the bin 12 by means of a pair of second pivot connections 20. The second pivot connections are defined by the ends of a pair of side arms 13 of a connector bar 15, which is mounted rotatably to the handles of the wheelbarrow at 20.

Figure 4:
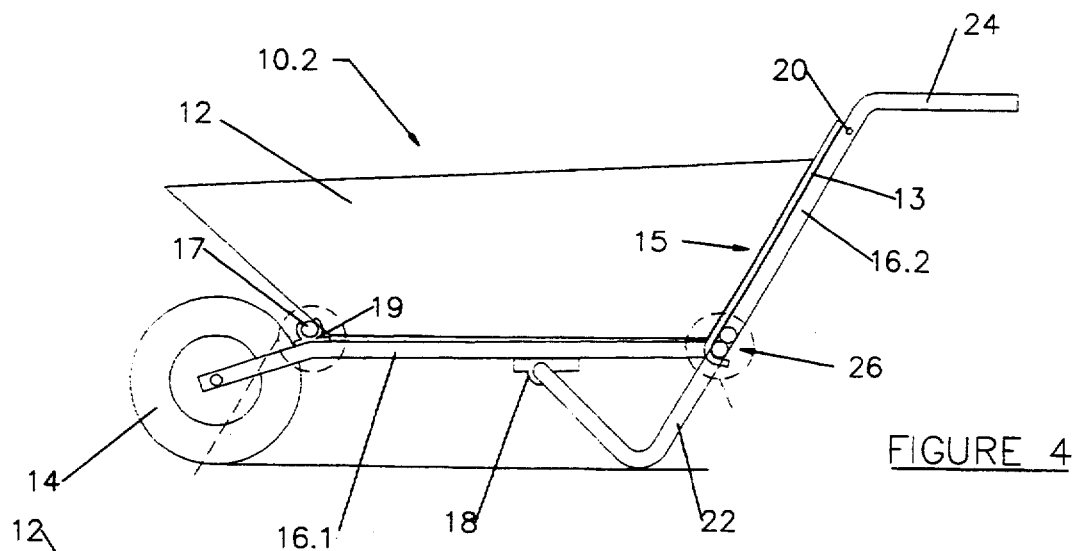
FIG. 4 is a side view of a wheelbarrow in accordance with another embodiment of the invention, showing exploded views 4(a) and 4(b) respectively of a clip 19 and connector bar 13.
Figure 4A:
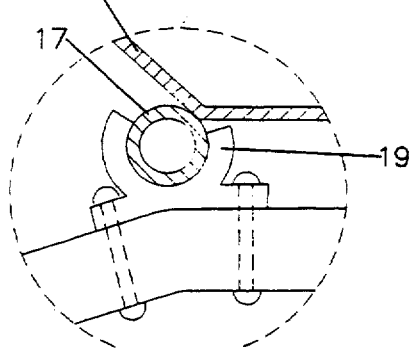
Figure 4B:
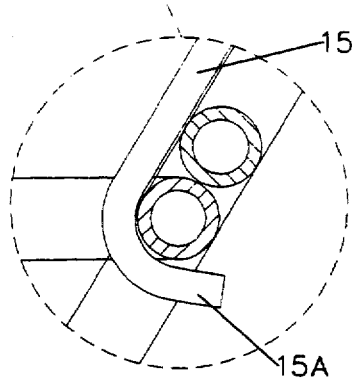
Figure 7:
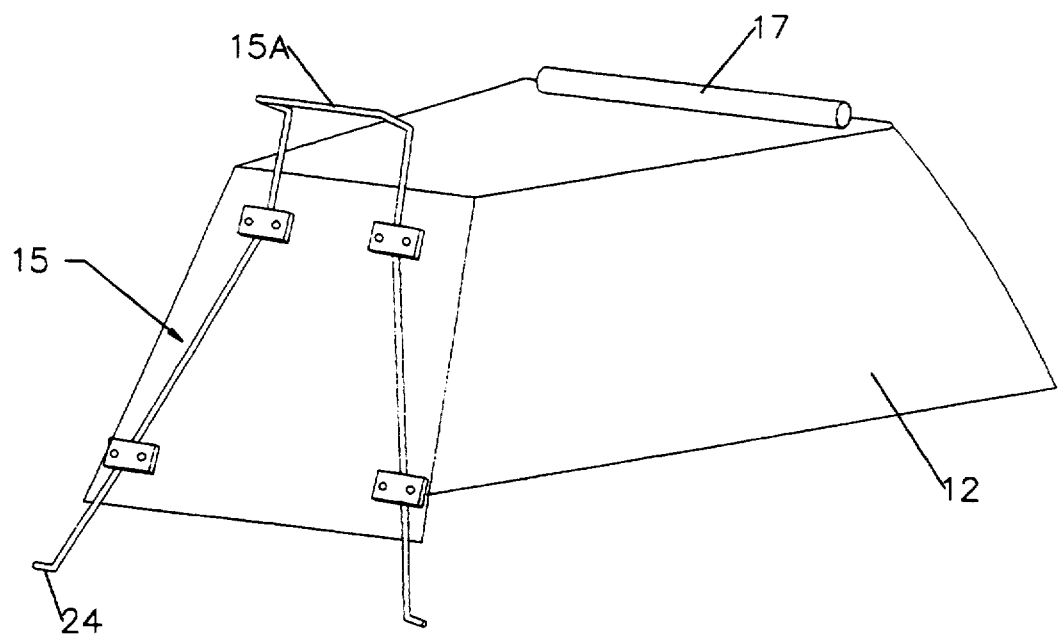
FIG. 7 is a view showing the underneath of the load bin.
Figure 8:
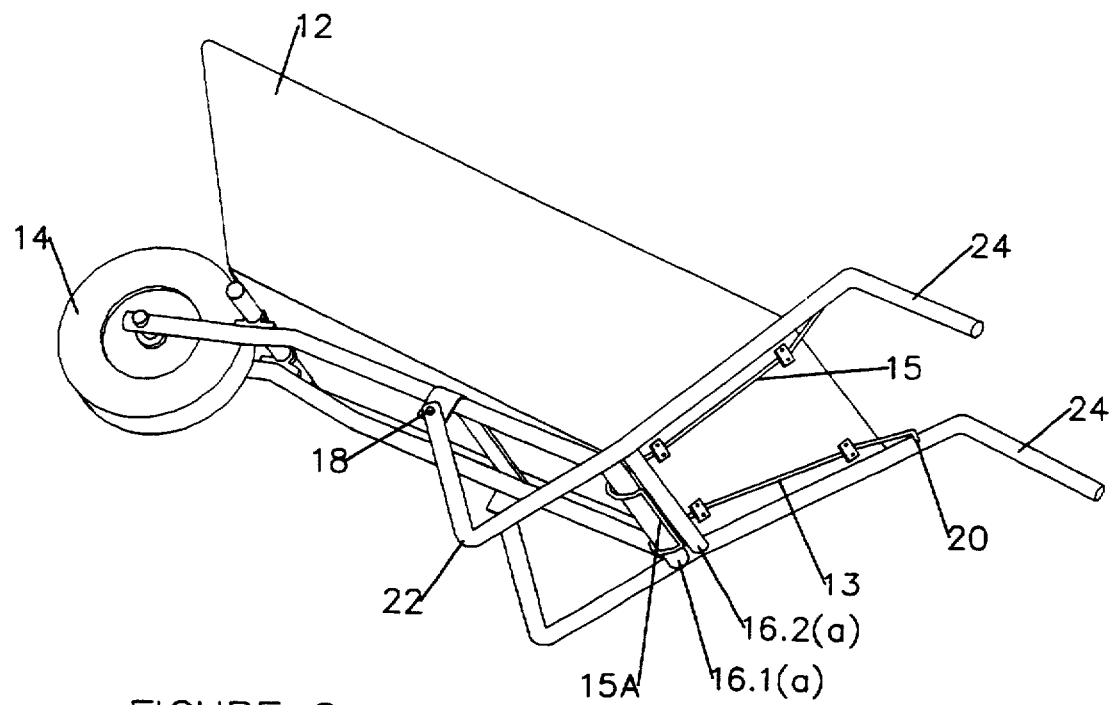
FIG. 8 is a pictorial view of the wheelbarrow on its side.

The connector bar 15 can be seen more clearly in FIGS. 4(b), 7 and 8. It will be seen in these figures that the connector bar 15 has a hook formation 15(a) at its operatively lower end. When the wheelbarrow is in the operative condition of the wheelbarrow, as shown in FIGS. 1, 4 and 8, the hook formation 15(a) is disposed between the rear end of the first component 16.1 and the second component 16.2, at the position indicated by reference numeral 26. As shown more clearly in FIG. 8, the hook formation 15(a) locks together a chassis member 16.1(a) on the first component with a complemental chassis bar 16.2(a) on the second component. In this way, the first and second components 16.1 and 16.2 are disconnectably secured together so that, when secured together, they are unable to pivot with respect to one another about the first pivot connections 18.

When the wheelbarrow 10.1 is in the operative condition as illustrated in FIGS. 1 and 2, the component 16.1 forms a support for the bin 12, extending rearwardly from the wheel 14 and supporting the bin 12 from underneath. The load bin is held removably in place on the first component 16.1 by a retaining bar 17, which in the operative condition of the wheelbarrow, is held and supported by a pair of clips 19. The clips 19 are not entirely necessary for the operation of the foldable wheelbarrow, but serve to retain the load bin securely in place on the first component 16.1 and prevent the rattling of the bin on the connecting structure 16 which would otherwise occur when an empty wheelbarrow is pushed over stony ground. At the rear of the bin 12, the first component 16.1 extends downwardly and then upwardly again, to form the wheelbarrow with a pair of legs 22.

The first pivot connections 18 are disposed forwardly of the rear end of the first component 16.1. The second component 16.2 extends from the first pivot connections 18 rearwardly and then upwardly to the second pair of pivot connection 20. The second component 16.2 further extends rearwardly beyond the second pair of pivot connections 20, to form the wheelbarrow with a pair of handles 24.

It will be noted that by unclipping the retaining bar 17 from the clips 19 and moving the load bin in the direction of arrow A in FIG. 1, the hook formation 15(a) will rotate clockwise in the drawing about the connections 20. This rotation draws the hooked formation 15(a) away from the position 26 in the direction of arrow B, and thereby disconnects the first component 16.1 from the second component 16.2 so that they are able to pivot with respect to one another about the first connections 18.

In the inoperative condition of the wheelbarrow, the hook formation 15(a) may serve as a handle to carry the wheelbarrow. It may also be used to suspend the wheelbarrow on the wall of the garage.

Referring now to FIG. 3, if the wheelbarrow 10.1 is to be collapsed, the connection at 26 is first disconnected by lifting the nose of the load bin in the direction of arrow C to withdraw the retaining bar 17 from the clips 19 (not shown in this figure). This allows the first and second components 16.1 and 16.2 to pivot with respect to one another about the first pivot connections 18. At this stage, the wheelbarrow is in the condition illustrated in FIG. 3(a).

Figure 3A:
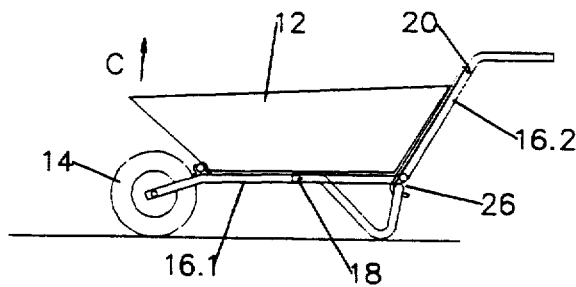
FIGS. 3(a) 3(b), 3(c) and 3(d) sequentially illustrate how the wheelbarrow of FIGS. 1 and 2 is collapsed from the operative conditions to the inoperative condition.
Figure 3B:
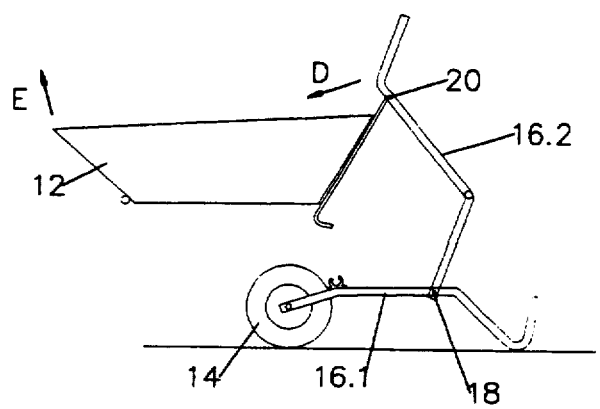
Figure 3C:
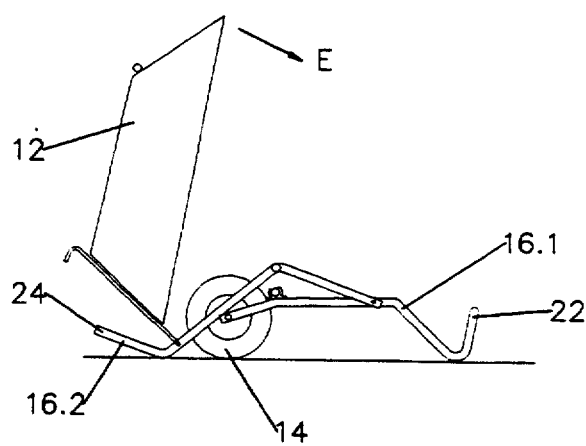
Figure 3D:
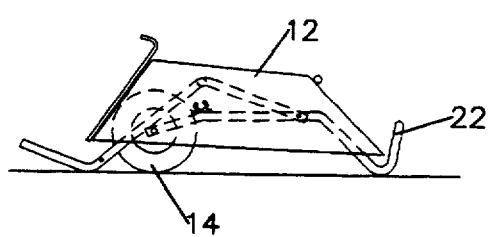

The second component 16.2 is now pivoted forwardly, in the direction of arrow D, about the first pivot connections 18, and the bin 12 pivoted about the pivot connections 20 in the direction of arrow E as shown in FIG. 3(b). Once the handles 24 are on the ground, in front of the wheel 14, as shown in FIG. 3(c), the bin 12 is pivoted further in the direction of arrow E, until it is in the position illustrated in FIG. 3(d). The forward upper edge of the bin 12 is now accommodated in the recesses formed by the legs 22; the wheel 14 and the first component 16.1 are partly accommodated in the bin; and the second component 16.2 is also accommodated partly in the bin. The wheelbarrow is now in a compact condition in which it can easily be accommodated in, for example, a trunk of a motor vehicle, or hung on a wall by the hooked formation 15a.

Figure 5:
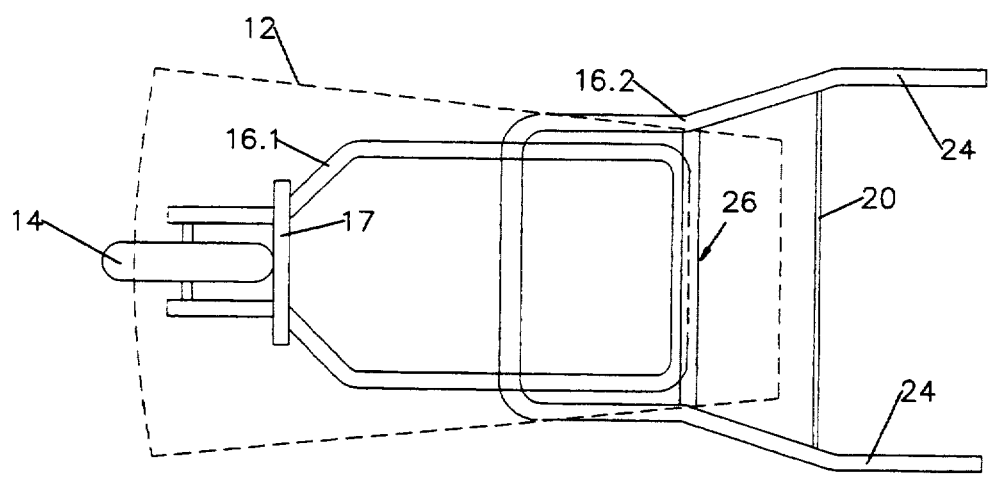
FIG. 5 is a plan view of the wheelbarrow of FIG. 4, the load bin thereof being shown in phantom outline.
Figure 6A:
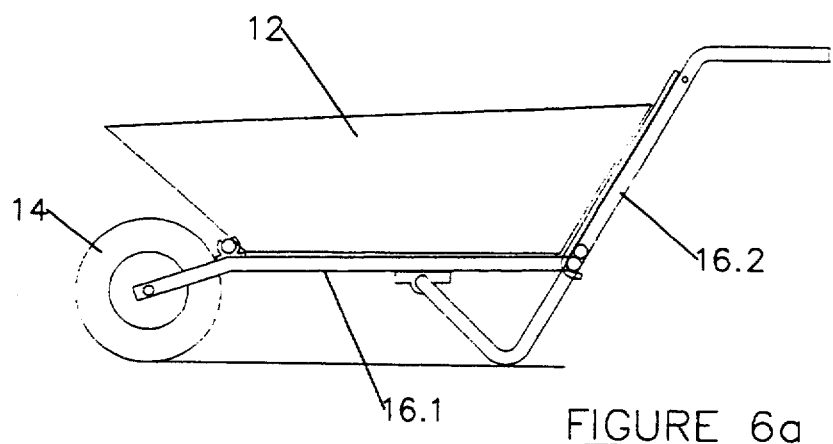
FIGS. 6(a) 6(b) and 6(c) sequentially illustrate how the wheelbarrow of FIGS. 4 and 5 is collapsed from the operative condition to the inoperative condition.
Figure 6B:
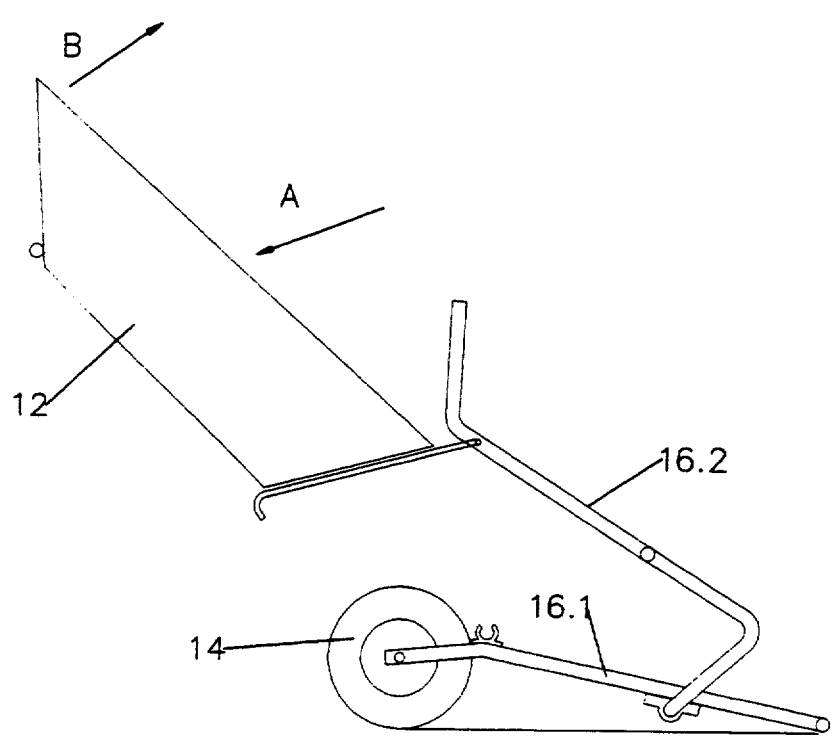
Figure 6C:
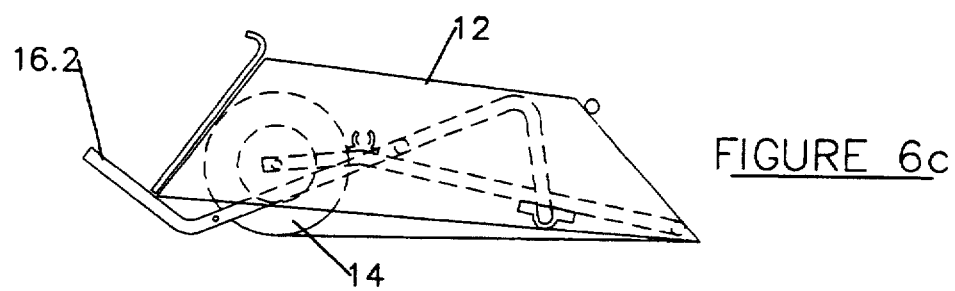

Referring now to FIGS. 4 to 6, there is illustrated a wheelbarrow 10.2 which is generally similar to the wheelbarrow 10.1 illustrated in FIGS. 1 to 3, the same reference numerals being used to indicate the same or similar parts. The wheelbarrow 10.2 differs from the wheelbarrow 10.1 essentially therein that the legs 22 form part of the second component 16.2, instead of forming part of the first component 16.1.

The first and second components of the wheelbarrow according to the invention may be made of appropriately sized tubing and bent to the required shape. Sophisticated welding equipment is not required. The bin 12 is typically made of light fiberglass material, but may be made of any suitable material.

The foldable wheelbarrow of the invention offers the advantages of a conventional wheelbarrow, but with far greater convenience. As it is lighter than a conventional wheelbarrow, and has the ability to collapse into small dimensions, it is ideally suited to the gardening and building requirements of a modern society.

I claim:

1. A wheelbarrow comprising a load bin, a wheel for supporting the wheelbarrow, and a connecting structure which connects the wheel to the load bin, said connecting structure being pivotally displaceable with respect to the load bin, and including first and second components, said wheel being mounted on the first component, said second component being connected to the first component by means of a first pivot connection, and said second component being connected to the bin by means of a second pivot connection, said second component extending upwardly and rearwardly from the bin to form handles for the wheelbarrow in an operative condition thereof.

2. A wheelbarrow according to claim 1, wherein the wheelbarrow further comprises legs which form part of the first component of the connecting structure.

3. A wheelbarrow according to claim 1, wherein the first component extends from the wheel rearwardly underneath the bin to form a support for the bin, in the operative condition of the wheelbarrow.

4. A wheelbarrow according to claim 1, wherein the wheelbarrow further comprises legs which form part of the second component of the connecting structure.

5. A wheelbarrow according to claim 1, wherein the arrangement of the first and second components is such that, by pivoting the first and second components about the first and second pivot connections, the first component with the wheel is displaced from its operative position to an inoperative position in which it is at least partly accommodated in the bin, and the second component is displaced from its operative position in which it is also at least partly accommodated in the bin.

* * * * *